Aug. 1, 1944.  E. M. SPLAINE ET AL  2,355,015
EYE PROTECTION DEVICE
Filed Nov. 17, 1941    2 Sheets-Sheet 1
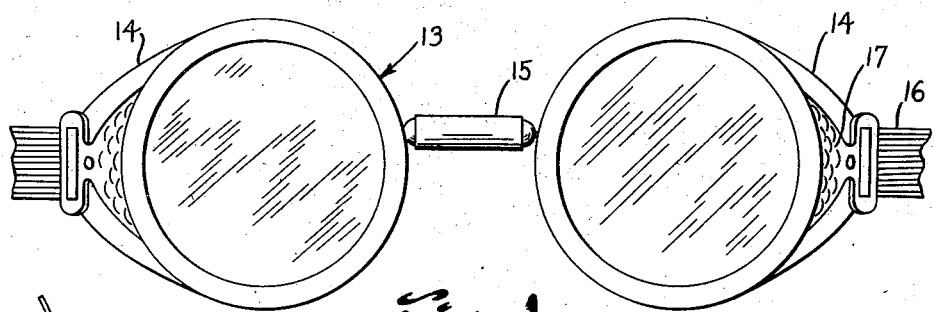
Fig. 1
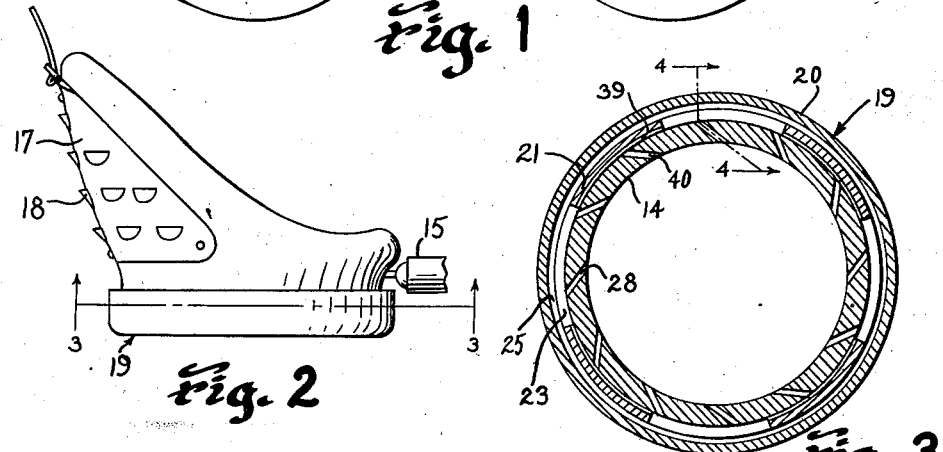
Fig. 2
Fig. 3
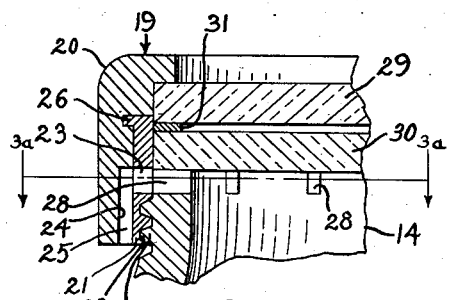
Fig. 4
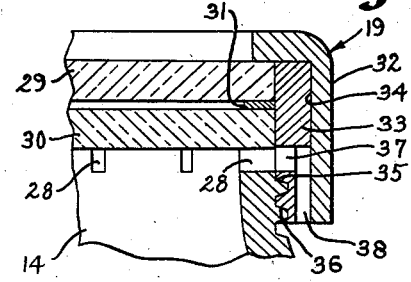
Fig. 5
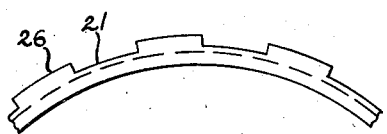
Fig. 6
EDWARD M. SPLAINE
WILLIAM H. LEHMBERG
INVENTORS
BY *Louis L. Gagnon*
ATTORNEY Aug. 1, 1944.  E. M. SPLAINE ET AL  2,355,015
EYE PROTECTION DEVICE
Filed Nov. 17, 1941  2 Sheets-Sheet 2

EDWARD M. SPLAINE
WILLIAM H. LEHMBERG
INVENTORS

BY Louis L. Gagnon
ATTORNEY

Patented Aug. 1, 1944

2,355,015

UNITED STATES PATENT OFFICE 2,355,015

EYE PROTECTION DEVICE

Edward M. Splaine, Southbridge, and William H. Lehmberg, Dudley, Mass., assignors to American Optical Company, Southbridge, Mass., a voluntary association of Massachusetts Application November 17, 1941, Serial No. 419,420

5 Claims. (Cl. 2—14)

This invention pertains to the class of eye protecting device which is ordinarily referred to as goggles, and more particularly concerns improved means of providing ventilation in a welding type goggle by the utilization of a novel ventilated ring which also excludes light from indirectly entering the interior of the goggle by means of the ports provided for ventilation.

Heretofore, it was a general practice to provide goggles with ventilating means on the side walls of the eye cups, which eye cups has dual side walls with staggered louvers on said side walls for the purpose of excluding stray light and providing ventilation.

A goggle that is worn by an individual who is exposed to injurious light rays of the order of infra-red and ultra-violet portions of the light spectrum will, when having the suitable lens for absorbing the injurious light rays, result in a heating when the lens due to the absorption of certain light rays, produce a heating within the lens per se. The heat created within the lens by the absorption of the injurious rays must of necessity be dissipated, which dissipation partially occurs on the inner surface of the goggle lens. Since the heating within the lens is partially dissipated on all points of the inner surface of the lens within the goggle, the natural convection currents within the eye cup of the goggle can be more adequately utilized for dissipating heat by using the ventilated ring shown herein by itself or may be used in combination with the conventional side wall ventilation of the eye cup.

While a ventilated ring was used on certain types of goggles employed for welding, the ventilated ring did not adequately exclude indirect light from entering the interior of the lens. Consequently, the injurious rays would indirectly enter the interior of the eye cup.

It is an object of the present invention to provide a goggle with improved means for adequately ventilating the interior of the goggle when in use while simultaneously excluding indirect light from entering the goggle.

A further object is to provide a goggle which suitably ventilates the interior of the eye cup by convection currents while excluding injurious rays of indirect light from entering the ventilating ports.

A further object of the invention is to provide a novel ventilating ring for holding at least one lens in fixed relation to an eye cup, which ventilating ring provides suitable ventilation and exclusion of injurious rays.

A further object of the invention is to provide a ventilating ring for a goggle, which ventilating ring has a multiplicity of tortuous paths therein to provide suitable ventilation for the goggle and simultaneous exclusion of indirect light from passing through said tortuous paths.

A further object of the invention is to provide a ventilating ring having a multiplicity of tortuous ports therein to provide adequate ventilation and exclusion of indirect light from passing through said tortuous ports, said ring being made of a single piece of material, or a combination of materials suitably connected.

A further object of the invention is to provide a ring for an eye goggle, which ring may have an exterior shell of either metal, fiber, plastic or other suitable substance combined with an inner ring of any suitable substance or of the same substance as the exterior shell, with intercommunicating ports in both said shell and said inner ring so that optimum exclusion of indirect light through said ports is effected while attaining the desideratum in ventilation.

A further object of the invention is to provide a ring for a goggle wherein either the shell or the inner ring is made of a moldable material with suitable locking means for moldably locking the shell with the inner ring.

Other objects may be and may become apparent to one skilled in the art without departing from the spirit of the invention as set forth in the annexed claims.

In the drawings:

Fig. 1 is a front view of a pair of goggles employing the invention.

Fig. 2 is a top view of one of the eye cups having a ventilated ring thereon.

Fig. 3 is a complete sectional view taken substantially along lines 3—3 of Fig. 2, and more specifically along lines 3a—3a of the enlarged cross sectional view in Fig. 4.

Fig. 4 is an enlarged sectional view partially broken away taken substantially along lines 4—4 of Fig. 3.

Fig. 5 is a modification taken substantially along lines 4—4 of Fig. 3.

Fig. 6 is an enlarged top view, partially broken away, of the inner ring in Fig. 4.

Figure 7:
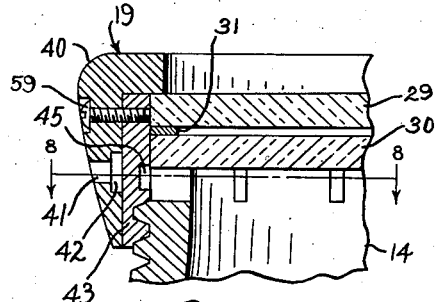
Fig. 7 is an enlarged sectional view, partly broken away, taken substantially along lines 7—7 of Fig. 8.

Referring to the drawings and more particularly to Fig. 1, an eye protection device 13 consists of two eye cups 14 which are interconnected by a flexible ball chain 15 having a head band portion 16 connected to said eye cups. A ventilating side wall 17 on each of the eye cups has louvers or ventilating portions 18 therein for assisting in ventilation of the individual eye cups.

The top view of one cup shown in Fig. 2 shows a ventilating ring 19 connected to the eye cup. Figs. 3 to 12 inclusive show various modifications of the ventilating ring 19. While this ventilating ring from all outward appearances may seem similar, the internal construction of each modification is different from any other modification shown and it is distinctive in that many aspects and features of the ventilating ring may be varied and modified to facilitate production for commercial manufacture. Various materials for the ventilating ring may be used which may require different structural elements such as when one of the elements is made of moldable material such as plastic used in conjunction with an unmoldable material such as fiber or metal, or when the outer shell and inner ring of the ventilating ring are separable by both being made of a plastic material.

Figs. 3 and 4 show a ventilating ring 19 having an outer shell 20. The inner ring 21 is made of metal and has threads 22 cut thereon. The inner ring 21 has a series of slots 23 therein to permit the passage of air therethrough. The teeth-like portions 26 as shown in the member 21 in Fig. 6 are used to provide a locking between the inner ring 21 and the shell 20 when said shell is made of plastic material. The lower portion of the shell 20 has a reduced portion 24 on the inner bottom surface thereof so that when the ring 21 and the shell 20 are properly connected together an annular groove 25 around the lower portion of the shell 20 is provided so that it communicates with the spaced grooves 23 in the inner ring. The eye cup 14 has complemental teeth 27 which are formed on the upper portion thereof and engage the teeth 22 on the inner ring 21 when the ventilating ring 19 is suitably screwed into connection with the eye cup 14. A plurality of slots 28 are formed about the upper edge of the eye cup and are inclined at an angle with the inner ring 21.

It will therefore be seen from Figs. 3 and 4 that there is a tortuous path to permit air to circulate through the port 25, thence through the ports 23 in the ring 21 and thence through the slots 28 to the inside of the eye cup.

In assembling the eye cup shown in Fig. 4 the outer lens 29 and the inner lens 30 are separated by a spacing member 31 to provide an air lock or dead air space between said lenses. The lenses are placed within the ventilating shell and said ring 19 is then threadedly connected to the eye cup 14.

Fig. 5 is somewhat similar in construction to Fig. 4 except that the ventilating ring 19 has a shell 32 which is adapted to receive an inner ring 33 having a shoulder 34 on the upper portion thereof, which shoulder 34 intimately engages the inner surfaces of the shell 32. The lower portion of the inner ring 33 has threads 35 thereon which engage the complemental threads 36 on the eye cup. The slots 28 communicate with the ports 37 formed in the inner ring and the annular groove 38 between the inner ring 33 and the shell 32.

By referring to Fig. 3, it will be seen that there is a space 39 between the inner ring 21 and the eye cup 14 so that ventilation may flow through the annular channel 25 through the slots 23, through the space 39 and through the slots 40. The slots 28 and 40 are identical. The purpose of referring to certain of the slots in the eye cup by the reference character 40 is to specifically point out that there is an intercommunicating ventilating port from the interior of the eye cup to the exterior thereof through each of the slots 28. Slot 40, which is identical with slot 28 is specifically referred to so that attention might be drawn to the fact that while the space 39 is not shown in Figs. 4 and 5, it nevertheless exists so that all of the slots 28 in the eye cup assist in ventilating the interior of said eye cup.

By referring to Fig. 3, it will be seen that substantially the same tortuous ventilating path of intercommunicating ports is formed as is present in Fig. 4. The essential difference between the two views shown in Figs. 4 and 5 is the method of securing the inner rings to the outer shells of the ventilating ring.

The ventilating ring in Fig. 5 may be of the split ring type which may be snapped within the shell, or screws may be provided to connect the shell with the inner ring in much the same manner as is shown in Fig. 7.

In Figs. 5, 7, 9, and 11, the lenses 29 and 30 employ a spacer 31. The lens assembly in all views is substantially the same as the assembly heretofore described in reference to Fig. 4.

Figure 8:
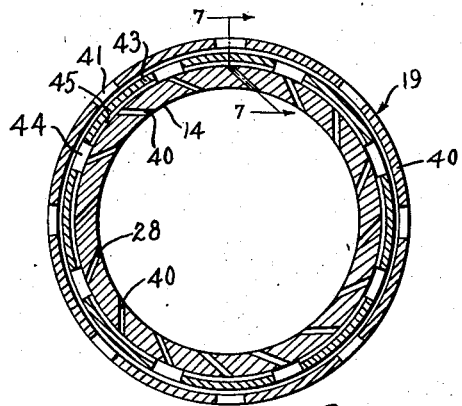
Fig. 8 is a complete sectional view taken substantially along lines 3—3 of Fig. 2 and more specifically along lines 8—8 of Fig. 7.

Fig. 7 shows the lens ring 19 having the shell 20 with a plurality of slots 41 spaced therein communicating with the annular groove 42. The inner ring 43 has its ventilating ports constructed substantially similar to the outer shell 20 since Fig. 8 shows slots 44 communicating with the annular groove 45 which provides a space between the inner ring 43 and the eye cup 14. The slots 44 in the inner ring are staggered in relation to the slots 41 of the outer ring so that there will be a circulation of air through the slots 41, the annular groove 42 in the shell, the slots 44 in the inner ring, and through the slots 28. It is again pointed out that the communicating air passage from slots 44 connects with the groove 45 and the slots 40. The outer shell 20 is locked in position with the inner ring 43 by one or more screws 59.

Figure 9:
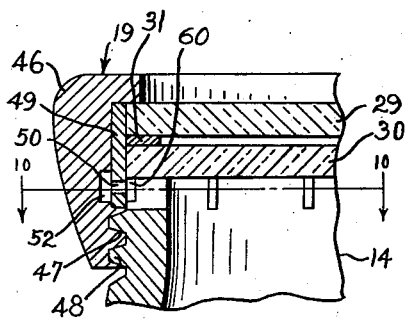
Fig. 9 is an enlarged sectional view, partly broken away, taken substantially along lines 9—9 of Fig. 10.

In Fig. 9, the ventilating ring 19 has an outer shell 46 which has threads 47 on the lower portion thereof which are threadedly connected to the threads 48 on the eye cup. The inner ring 49 has a series of slots 50 therein, which inner ring may be of the split type to be snapped into position, or may be molded in the shell.

Figure 10:
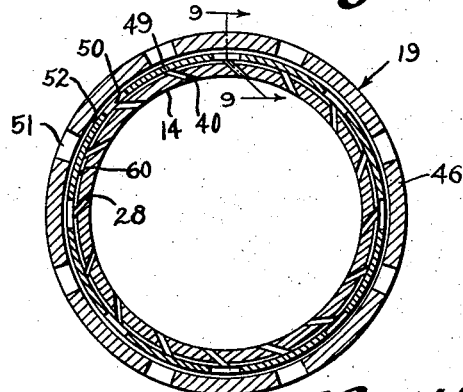
Fig. 10 is a complete sectional view taken substantially along lines 3—3 of Fig. 2 and more specifically along lines 10—10 of Fig. 9.

Referring to Fig. 10 it will be seen that the series of slots 51 are spaced around the shell 46. The reduced portion 60 of the eye cup 14 forms an annular groove between the inner ring 49 and the eye cup 14 so that the slots 40 opposite the solid portion of the ring 49 may receive ventilation through the slots 51, the annular groove 52 in the shell, and through the slots 50. The slots 28 are similar to the slots 40 and are given separate reference characters for the purposes pointed out above.

The groove 52 which is formed in the eye cup 14 functions substantially the same as the groove 45 in Fig. 7, that is, to provide ventilation to the slots such as 40 when said slots do not directly communicate with the openings such as 44 in Fig. 8.

Figure 11:
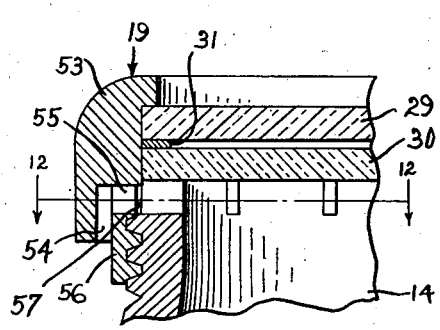
Fig. 11 is an enlarged sectional view, partly broken away, taken substantially along lines 11—11 of Fig. 12.
Figure 12:
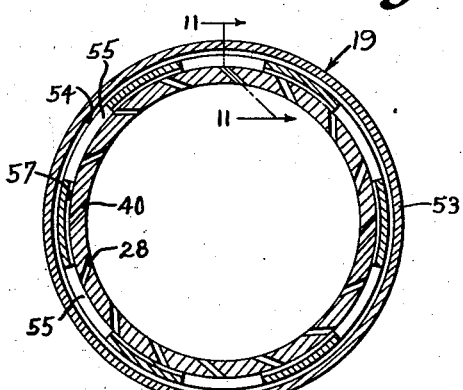
Fig. 12 is a complete sectional view taken substantially along lines 3—3 of Fig. 2 and more specifically along lines 12—12 of Fig. 11.

In Fig. 11 the ventilating ring 19 has a unitary shell structure with an outer shell 53 which has an annular groove 54 on the lower portion thereof which communicates with the slots 55 formed in the protruding portion 56. The shell 53 is integral with the protruding portion 56 so that the shell is combined with what was formerly the inner ring feature so that the two are of a homogeneous material forming a unitary ventilating ring. The annular groove 57 is on the same plane as the slot 55 so that the slots 55 and the groove 57 communicate so that the slots 40 in the eye cup may assist in ventilating as well as the slots 28 which directly communicate with the slots 25 in the ventilating ring 19.

Figs. 9 and 10 are the only figures which show an annular groove cut into the eye cup, so that ventilation may be obtained through the slots such as 40 as well as through the slots 28. However, it is pointed out that the annular groove for communicating with the slots such as 40 may either be provided by an annular groove such as 60 (Fig. 9) which is formed in the eye cup or an annular groove such as 57 (Fig. 12) which is formed on the protruding portion 56 (Fig. 11) or on the inner ring wherein said inner ring is a distinct member from the shell of the ventilating ring, or a combination of the two.

In Fig. 4, the shell is preferably made of plastic with the inner ring made preferably of metal. However, the plastic shell may be used with any other suitable material for the inner ring.

In Fig. 5, the outer shell may be made of plastic, fiber, or metal while the inner ring may be made of any suitable material with an adequate means for securing the inner ring to the shell.

Figs. 7 and 9 likewise may have the shell of any suitable material such as a plastic with the inner ring of a suitable material such as fiber, metal, or plastic.

In Fig. 11, the ventilating ring may be made of any suitable material and good results have been obtained with both fiber and metal, but a plastic material may be used to form a suitable ventilating ring which provides tortuous paths to permit air passage from the interior to the exterior of the eye cup.

From the foregoing, it will be seen that a ventilating ring has been provided with a multiplicity of tortuous paths therein to permit a natural flow of convection currents to cool the inner surface of the inner lens to prevent the lens from becoming misty. The condensation on the inner lens is commonly referred to as fogging and with the adequate ventilation provided by the present invention it will be seen that the fogging will be greatly restricted.

The ventilated ring of the type set forth not only provides ventilation, but reiterating, provides a multiplicity of tortuous paths so that when the wearer is exposed to light rays that are injurious to the eyes, the tortuous communicating ports in the ventilating ring will prevent any light from directly entering the inside of the eye cup. The side walls of the various intercommunicating ports may be treated in a conventional manner to prevent reflection of light therefrom where the material is such that reflection would ordinarily take place. However, certain or all of the intercommunicating ports may be made in material which does not reflect light ordinarily. Consequently, it will require no special treatment.

While various modifications of the ventilating ring have been shown, it is to be understood that other modifications and changes might be made in the invention by the use of equivalent parts without departing from the spirit of the invention as embraced in the subjoined claims.

Having described our invention, we claim:

1. In a device of the character described the combination of an eye cup having a lens supporting edge provided with a plurality of spaced slots extending throughout the thickness of the side wall of the eye cup and a threaded portion adjacent said slotted edge, a lens retaining ring member having a continuous uninterrupted threaded portion for interconnection with the threaded portion of the eye cup, said lens retaining ring member, when in assembled relation with the eye cup and in position of use for retaining a lens on the lens supporting edge of the eye cup, having an inner wall portion spaced from the adjacent wall of the eye cup to provide an annular groove forming an uninterrupted passageway circumferentially of the eye cup for circulation of air between the eye cup and the inner wall, said retaining ring member also having an annular groove intermediate the inner and outer walls thereof substantially concentric with the first groove and having a plurality of spaced slots in the inner wall portion thereof, communicating with said inner and outer annular grooves, said inner annular groove communicating with said spaced slots in the lens supporting edge of the eye cup and said outer annular groove having communication with air externally of the eye cup and in offset relation with the slots which communicate with the inner and outer annular grooves.

2. In a device of the character described the combination of an eye cup having a lens supporting edge provided with a plurality of spaced slots extending throughout the thickness of the side wall of the eye cup and a threaded portion adjacent said slotted edge, a lens retaining ring comprising outer and inner normally separate annular portions assembled in fitted relation with each other to form a unitary structure having a continuous annular groove intermediate the side walls thereof, said lens retaining ring having a continuous uninterrupted threaded portion for interconnection with the threaded portion of the eye cup, said inner annular portion of the lens retaining ring, when in assembled relation with the eye cup and in position of use for retaining a lens on the lens supporting edge of the eye cup, having an inner wall portion spaced from the adjacent wall of the eye cup to provide an annular groove forming an uninterrupted passageway circumferentially of the eye cup for circulation of air between said eye cup and said inner wall, with said inner annular portion having a plurality of spaced slots therein communicating with the inner annular groove and with the groove intermediate the side walls of said inner and outer annular portions, said inner annular groove communicating with the spaced slots in the lens supporting edge of the eye cup and said groove intermediate the outer and inner annular members having communication with air externally of the eye cup and in offset relation with the slots in the inner annular portion.

3. In a device of the character described the combination of an eye cup having a lens supporting edge provided with a plurality of spaced slots extending throughout the thickness of the side wall of the eye cup, and a threaded portion adjacent said slotted edge, a lens on said slotted lens supporting edge, a lens retaining ring member having a flange-like portion for overlying the outer side surface of the lens and a continuous uninterrupted threaded portion for interconnection with the threaded portion of the eye cup to retain the lens on the lens supporting edge, said lens retaining ring member, when in assembled relation with the eye cup and in position of use for retaining a lens on the lens supporting edge of the eye cup, having an inner wall portion spaced from the adjacent wall of the eye cup to provide an annular groove forming an uninterrupted passageway circumferentially of the eye cup for circulation of air between the eye cup and the inner wall, said retaining ring member also having an annular groove intermediate the inner and outer walls thereof substantially concentric with the first groove and having a plurality of spaced slots in the inner wall portion thereof communicating with said inner and outer annular grooves, said inner annular groove communicating with said spaced slots in the lens supporting edge of the eye cup and said outer annular groove having communication with air externally of the eye cup and in offset relation with the slots which communicate with the inner and outer annular grooves.

4. In a device of the character described the combination of an eye cup having a lens supporting edge provided with a plurality of spaced slots extending throughout the thickness of the side wall of the eye cup, and a threaded portion adjacent said slotted edge, a lens on said slotted lens supporting edge, a lens retaining ring comprising outer and inner normally separate annular portions assembled in fitted relation with each other to form a unitary structure having a flange-like portion for overlying the outer side surface of the lens, a continuous annular groove intermediate the side walls thereof and a continuous uninterrupted threaded portion for interconnection with the threaded portion of the eye cup to retain the lens on the lens supporting edge, said inner annular portion of the lens retaining ring, when in assembled relation with the eye cup and in position of use for retaining a lens on the lens supporting edge of the eye cup, having an inner wall portion spaced from the adjacent wall of the eye cup to provide an annular groove forming an uninterrupted passageway circumferentially of the eye cup for circulation of air between said eye cup and said inner wall, with said inner annular portion having a plurality of spaced slots therein communicating with the inner annular groove and with the groove intermediate the side walls of said inner and outer annular portions, said inner annular groove communicating with the spaced slots in the lens supporting edge of the eye cup and said groove intermediate the outer and inner annular portions having communication with air externally of the eye cup and in offset relation with the slots in the inner annular portion.

5. In a device of the character described the combination of an eye cup having a lens supporting edge provided with a plurality of spaced slots extending throughout the thickness of the side wall of the eye cup and a threaded portion adjacent said slotted edge, a lens retaining ring comprising an outer annular shell portion having an inwardly extending portion shaped to overlie the outer side surface of the lens and an annular member secured inwardly thereof with a portion of the outer side surface of said annular member in intimate engagement with a portion of the inner side surface of the annular shell portion and with the remainder of said adjacent surfaces in spaced relation with each other to produce a continuous annular groove, said inner annular member having a threaded portion for interconnection with the threaded portion of the eye cup and having spaced slots extending therethrough and communicating with the annular groove between said inner annular member and said outer shell portion, said inner annular member, when in secured relation with the eye cup, having a portion of its inner surface in spaced relation with the adjacent side surface of the eye cup throughout the circumference of said eye cup to produce an inner annular groove substantially concentric with the first annular groove, said inner annular groove communicating with the slots in the lens supporting edge of the eye cup and with the spaced slots in the inner annular member and said outer annular groove having communication with air externally of the eye cup and in indirect relation with the slots in said inner annular member.

WILLIAM H. LEHMBERG.
EDWARD M. SPLAINE.